(12) United States Patent
Svanebjerg et al.

(10) Patent No.: US 8,348,178 B2
(45) Date of Patent: Jan. 8, 2013

(54) SPRAYING INSTALLATION

(75) Inventors: Elo Svanebjerg, Tappernoeje (DK); Martin Hoejholm Jakobsen, Soroe (DK)

(73) Assignee: Vestergaard Company A/S, Roskilde (DK)

( * ) Notice: Subject to any disclaimer, the term of this patent is extended or adjusted under 35 U.S.C. 154(b) by 106 days.

(21) Appl. No.: 12/682,010

(22) PCT Filed: Oct. 8, 2007

(86) PCT No.: PCT/IB2007/002978
§ 371 (c)(1),
(2), (4) Date: Jul. 28, 2010

(87) PCT Pub. No.: WO2009/047578
PCT Pub. Date: Apr. 16, 2009

(65) Prior Publication Data
US 2010/0282877 A1    Nov. 11, 2010

(51) Int. Cl.
*B05B 1/20* (2006.01)

(52) U.S. Cl. ............................ 239/165; 239/166; 169/24

(58) Field of Classification Search .................. 239/164, 239/165, 172, 175, 166; 169/24
See application file for complete search history.

(56) References Cited

U.S. PATENT DOCUMENTS
4,565,321 A * 1/1986 Vestergaard .................. 239/172
5,746,396 A   5/1998 Thorton-Trump FOREIGN PATENT DOCUMENTS
DE    299 03 718    9/1999
EP    1 775 218     4/2007
WO    WO 83/02100   6/1983

* cited by examiner

*Primary Examiner* — Christopher Kim
(74) *Attorney, Agent, or Firm* — Stites & Harbison PLLC; Marvin Petry

(57) ABSTRACT

Spraying installation (1) on a chassis (2) of a truck (3), comprising a spraying nozzle (4) at the free end of a telescopic arm (5) attached to the chassis (2) via elevation means, characterized by the telescopic arm (5) being supported in a first position (A) oriented along the length of the truck (3) and above the top of the truck, wherein the telescopic arm (5) is stowed in a horizontal transport position, and supported in at least one other, active position (B, C), whereby the telescopic arm stays in a horizontal position during the movement between said positions (A and B, C) in a space confined between the vertical planes of the two sides of the truck.

8 Claims, 2 Drawing Sheets

SPRAYING INSTALLATION

Figure 1:
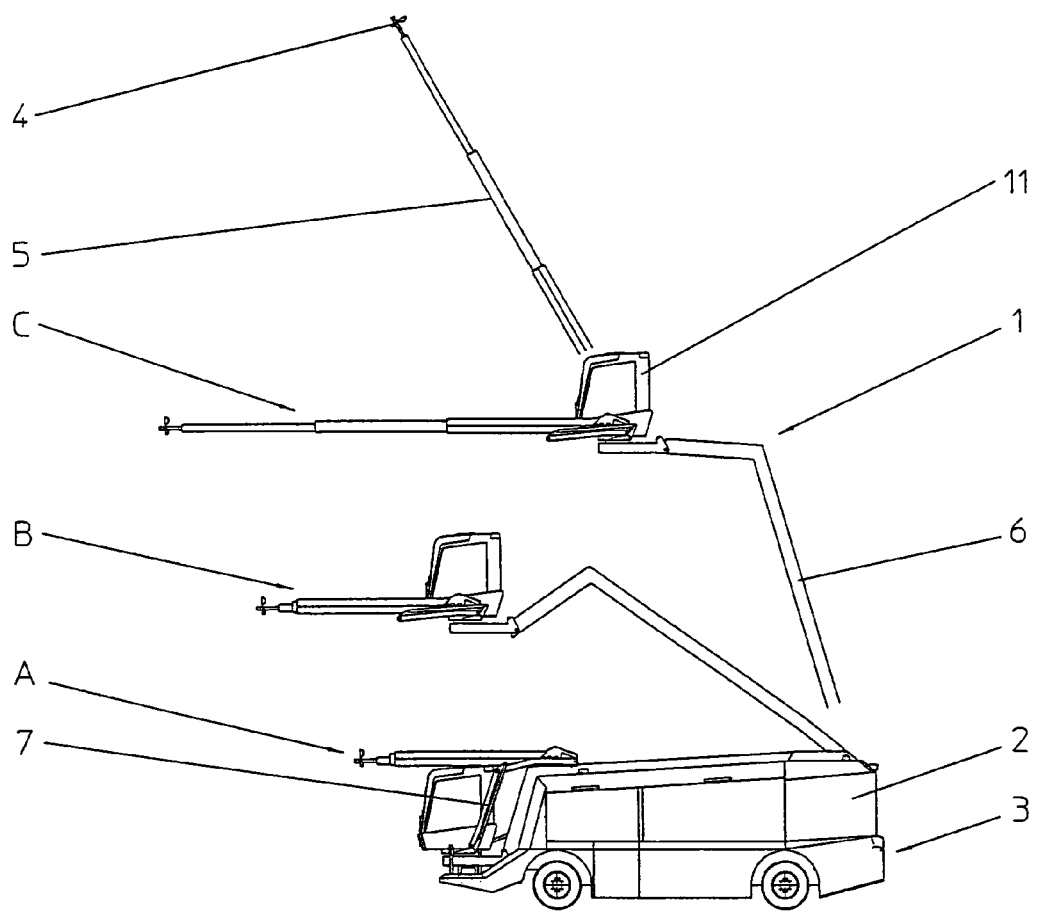

The invention relates to a spraying installation mounted on top of a chassis of a truck, the spraying applications being optional for de-icing and anti-icing of aircraft, depainting and fire fighting etc.

Prior art according to EP 1775218 shows a vehicle for de-icing of aircrafts in which a vehicle is provided with a telescopic boom having a cabin at its farther end, and with the cabin being provided with a telescopic arm having a spray nozzle attached to the end thereof, and being shiftable between a vertical transport position and a horizontal active position.

This prior art construction has limitations to the length of the nozzle-equipped arm, even before being extended, which is by its nature limited to extend from the cabin, and this also creates the limit for how much forward of the cabin front the arm can be extended. It can often be problematic for the telescopic arm to carry its own weight.

It is the purpose of this invention to provide a spraying installation as mentioned above, whereby the limitations known from the prior art are dealt with in such a way that the construction according to the invention makes it possible to provide a telescopic arm having a secure action range much larger than in the '218 EP patent, and that the positioning of the spraying installation in its transport position will require only a narrow space confined by the sides of the truck and by a comparatively little height above the truck top.

The purpose has been obtained by a spraying installation according to the preamble of claim 1 and characterized by the telescopic arm being supported in a first position oriented along the length of the truck and above the top of the truck, wherein the telescopic arm is stowed in a retracted, horizontal transport position, and supported in a second, active position, whereby the telescopic arm stays horizontal during the movement between said positions in a space confined between the vertical planes of the two sides of the truck.

The big advantage is that according to the invention, the space around the truck in which the telescopic arm moves is no wider than the truck, which enhances the maneuverability around the aircraft, while at the same time the telescopic arm could be kept longer than that of other competing spraying trucks due to its retracted pivot point.

Telescopic arms having a long main body would require fewer telescopic segments, thereby a more robust cross section for a specific range. The telescopic arm according to the invention would easily show a range of up to 10 m, which allows for a very efficient spraying installation.

In one embodiment of the invention, the elevation means comprises an elevation boom and a linkage system based on a parallelogram construction comprising at least one pair of parallel beams and at least one pair of brackets, the beams being connected at each end to at least one of the top and bottom brackets, the top bracket being rotatably linked to the telescopic arm, and the bottom bracket being rotatably linked to the elevation boom for movement of the telescopic arm by the linkage system between the transport position and the active position substantially in parallel with the ground.

In another embodiment of the invention, the upper end of the elevation boom is provided with an operator platform whereto the telescopic arm is attached by means of the bottom brackets of the linkage system.

The said parallelogram embodiment includes a bottom bracket comprising a bracket plate and a bracket foot to be attached to the operator platform by fastening means and having a throughbore for a pivot bolt to be inserted through a corresponding hole in the bracket plate, said bracket plate also having holes for pivot bolts to rotate the beams over a circular arc in a vertical plane, and wherein the top bracket comprises a bracket plate with pivot holes for attachment of the beams and the telescopic arm.

The telescopic arm having arrived at an active position B—determined by the elevation of the elevation boom—can be variably extended telescopically forward of the elevation boom to take up a position C, in which the telescopic arm can rotate horizontally and can advantageously tilt +70°/−10°; preferably +60°/−6°, relative to the horizontal level and in the operator's field of view, while in the transport position the telescopic arm is shifted backwards and above the platform out of the operator's field of vision.

One of the applications for which the spraying installation according to the invention is useful is de-icing and anti-icing of aircraft. Other applications would be painting or removing paint or rust from surfaces, or firefighting to name a few.

Also, the invention provides a truck mounted with a spraying installation as described above and being at the same time an operator's platform and a fully functional driver's cabin, regardless of the elevation position of the platform/cabin.

Having followed the principles defined, we arrive at a spraying installation which provides us with a truck that can be driven and operated from the same operator position and that requires very little space in front of and above the sides of the truck, thereby providing a great deal of maneuverability, as the truck operates around aircrafts. Only when ready for action the spraying installation needs to be extended, and for that situation the truck is supposed to be stationary, or driving at a low speed.

Figure 2:
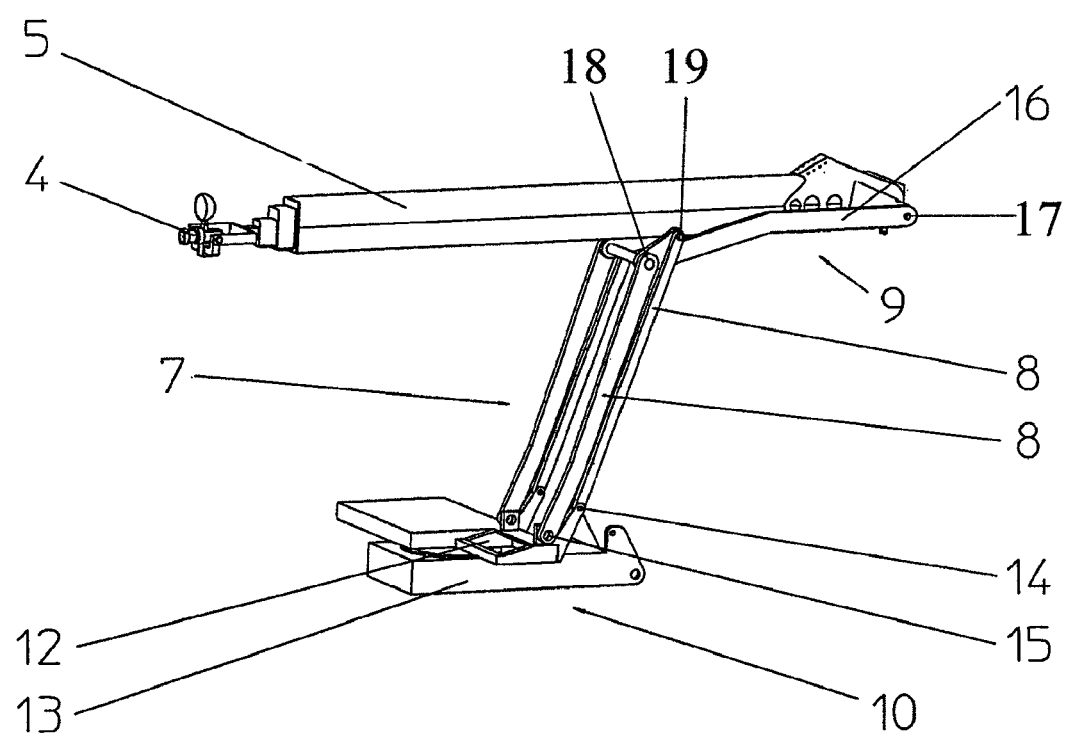

Hereafter an exemplary embodiment of the invention will be described in detail with reference to the drawing, which shows in:

FIG. 1 a truck with a spraying installation according to the invention and in three different positions, i.e. a transport position, a ready position with the elevation boom elevated, and an active position with the telescopic arm extended and tilted in the vertical plane, and in FIG. 2 a detailed view of the parallelogram construction of the linkage system.

FIG. 1 shows a truck 3 having a chassis 2 and a spraying installation 1 mounted on the chassis.

The spraying installation 1 comprises a spraying nozzle 4 attached to the free end of a telescopic arm 5, which is attached to the chassis 2 of the truck 3 via elevation means.

The elevation means comprises an elevation boom 6 elevated about one end, while at the other end a linkage system 7 connects to the telescopic arm 5 and moves it between a transport position A along the top of the truck 3 via a ready position B to an active position C wherein the arm 5 can be extended to a variable range, and during said movement the telescopic arm 5 is kept in a horizontal position.

Having arrived in the ready or active position, the telescopic arm is allowed to turn in a horizontal plane and to tilt over a circular arc in the vertical plane under supervision of an operator/driver.

This means that the truck according to the invention only requires much space when it is situated where the action is to take place.

The technical problem of having a long telescopic arm 5 which can be moved between a transport position A and an active position B, C, requiring a very modest space to do this, is solved by means of the linkage system 7 according to the invention, which carries the arm 5 forward from a transport position A to an active position B, C in a sliding movement keeping the arm 5 horizontal during the whole movement, so when the operator needs to watch and guide the spray nozzle 4, it is moved into the spraying position by the linkage system 7 making a parallelogram movement to lower the arm 5 to be level with the bottom of a platform 11.

The linkage system 7 is comprised of at least one pair of parallel beams 8 and at least one pair of brackets 9, 10, the beams 8 being connected at each end to at least one of the top and bottom brackets 9, 10, the top bracket being rotatably linked to the telescopic arm 5, and the bottom bracket 10 being rotatably linked to the elevation beam 6 for movement of the telescopic arm 5 by the linkage system 7 between the transport position A and the active position B, C.

In a detailed explanation of the linkage system 7, it should be understood that in the parallelogram construction of the linkage system 7, the bottom bracket 10 comprises a bracket plate 12 and a bracket foot 13 to be attached to the operator platform 11 by fastening means and having a throughbore for a pivot bolt to be inserted through a corresponding hole 14 in the bracket plate 12. Said bracket plate 12 also has holes 15 for pivot bolts to rotate the beams 8 over a circular arc in a vertical plane. The top bracket 9 comprises a bracket plate 16 with pivot holes 17, 18 and 19 for attachment of the telescopic arm 5 and the beams 8, respectively.

In a currently preferred embodiment of the invention, the spraying installation 1 is mounted on the truck 3 in a laterally offset position relative to the main axis through the truck, so the installation is situated fully to the one side of the operator platform 11 making the mounting very compact.

LIST OF REFERENCES 1. spraying installation
2. chassis
3. truck
4. nozzle
5. telescopic arm
6. elevation boom
7. linkage system
8. beams
9. top bracket
10. bottom bracket
11. operator platform/driver's cabin
12. bottom bracket plate
13. bracket foot
14. pivot hole
15. pivot holes
16. top bracket plate
17-19. pivot holes
A. transport position
B. active (ready) position, without telescopic extension
C. active position, with telescopic extension.

The invention claimed is:

1. A spraying installation on a chassis of a truck, the truck having a top, two sides defining two vertical planes, a front end and a rear end defining a lengthwise direction of the truck between said front end and said rear end, the spraying installation comprising:
   an elevation boom having a free end and an opposite end attached to the chassis of the truck;
   a telescopic arm, having a first free end and a second end attached to the free end of said elevation boom, the telescopic arm being movable to be supported in a first essentially horizontal transport position extending in the lengthwise direction of the truck and above the top of the truck, the telescopic arm being movable to also be supported in at least one other, active position which is higher than the transport position;
   the telescopic arm being configured to stay essentially horizontal during movement between said first essentially horizontal transport position and said at least one other active position, said movement further being confined to a space between said vertical planes defined by the two sides of the truck;
   a spraying nozzle, attached at the first free end of the telescopic arm;
   said elevation boom being attached to the telescopic arm by a linkage system, said linkage system comprising a parallelogram construction having at least one pair of parallel beams, a bottom bracket and a top bracket, each of said parallel beams being connected for rotation about an axis at one end to the bottom bracket and about another axis at the other end to the top bracket, the top bracket further being rotatably linked to the telescopic arm for rotation of the telescopic arm about an axis parallel to the said axes of the connections of the beams to the brackets, and the bottom bracket further being rotatably linked to the elevation boom, such that movement of the elevation boom, acting through the linkage system, results in a movement of the telescopic arm between said horizontal transport position and said at least one other, active position; and
   an operator platform attached to the bottom bracket of the linkage system.

2. The spraying installation according to claim 1, wherein the operator platform comprises a front end and a rear end, the rear end being adjacent to the free end of the elevation boom, the direction from the rear to the front ends of the operator platform defining a direction relative to the operator platform, and wherein the telescopic arm in its at least one active position is extendable in a variable range forward of the platform, and in its transport position the telescopic arm is in a retracted position above the top of the operator platform.

3. The spraying installation according to claim 1, wherein said telescopic arm including said spraying nozzle is mounted for full rotational freedom of movement in a horizontal plane and for limited vertical movement, when said telescopic arm is in the at least one active position.

4. The spraying installation according to claim 3, wherein the limited vertical movement is a limited arc movement relative to a horizontal plane comprising a range of 70° up to 10° down.

5. The spraying installation according to claim 4, wherein the limited vertical movement comprises a range of 60° up to 6° down.

6. The spraying installation according to claim 1 wherein the telescopic arm can move into its transport position by moving horizontally backwards relative to the truck, and over the top of the truck.

7. A spraying installation according to claim 1, wherein said operator platform further comprises a fully functional driver's cabin whether the telescopic arm is in the transport position or in the at least one other active positions.

8. A spraying installation according to claim 7, defining a main axis as the axis extending along the lengthwise direction of the truck in the middle between the two sides of the truck, and wherein the spraying installation is mounted on the top of the truck in a laterally displaced position relative to said main axis and located to one side of the operator platform.

* * * * *